Sept. 10, 1929.    C. H. KIRBY    1,727,605
COOPERATING HEAT AND FUEL REGULATION FOR INTAKE MANIFOLDS
Filed May 14, 1926    4 Sheets-Sheet 1

Inventor
Charles H. Kirby
By Whittemore Hulbert Whittemore
& Belknap
Attorneys

Sept. 10, 1929.  C. H. KIRBY  1,727,605
COOPERATING HEAT AND FUEL REGULATION FOR INTAKE MANIFOLDS
Filed May 14, 1926   4 Sheets-Sheet 2

Inventor
Charles H. Kirby
By Whittemore Hulbert Whittemore
& Belknap
Attorneys

Sept. 10, 1929.   C. H. KIRBY   1,727,605
COOPERATING HEAT AND FUEL REGULATION FOR INTAKE MANIFOLDS
Filed May 14, 1926   4 Sheets-Sheet 3
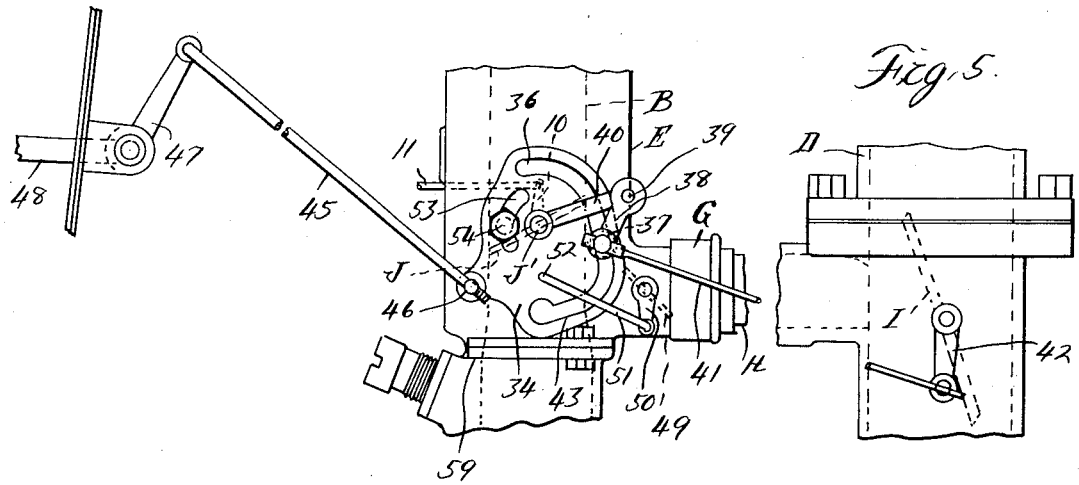
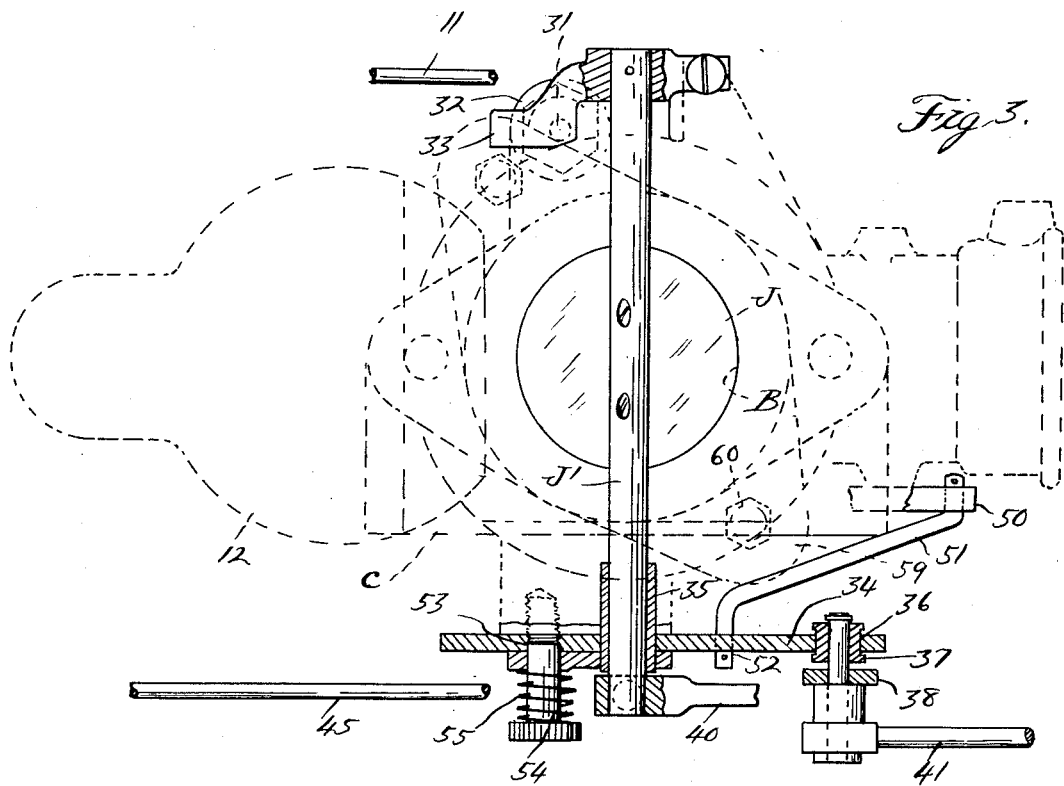
Inventor
Charles H. Kirby
By Whittemore Hulbert Whittemore
 + Belknap
Attorneys

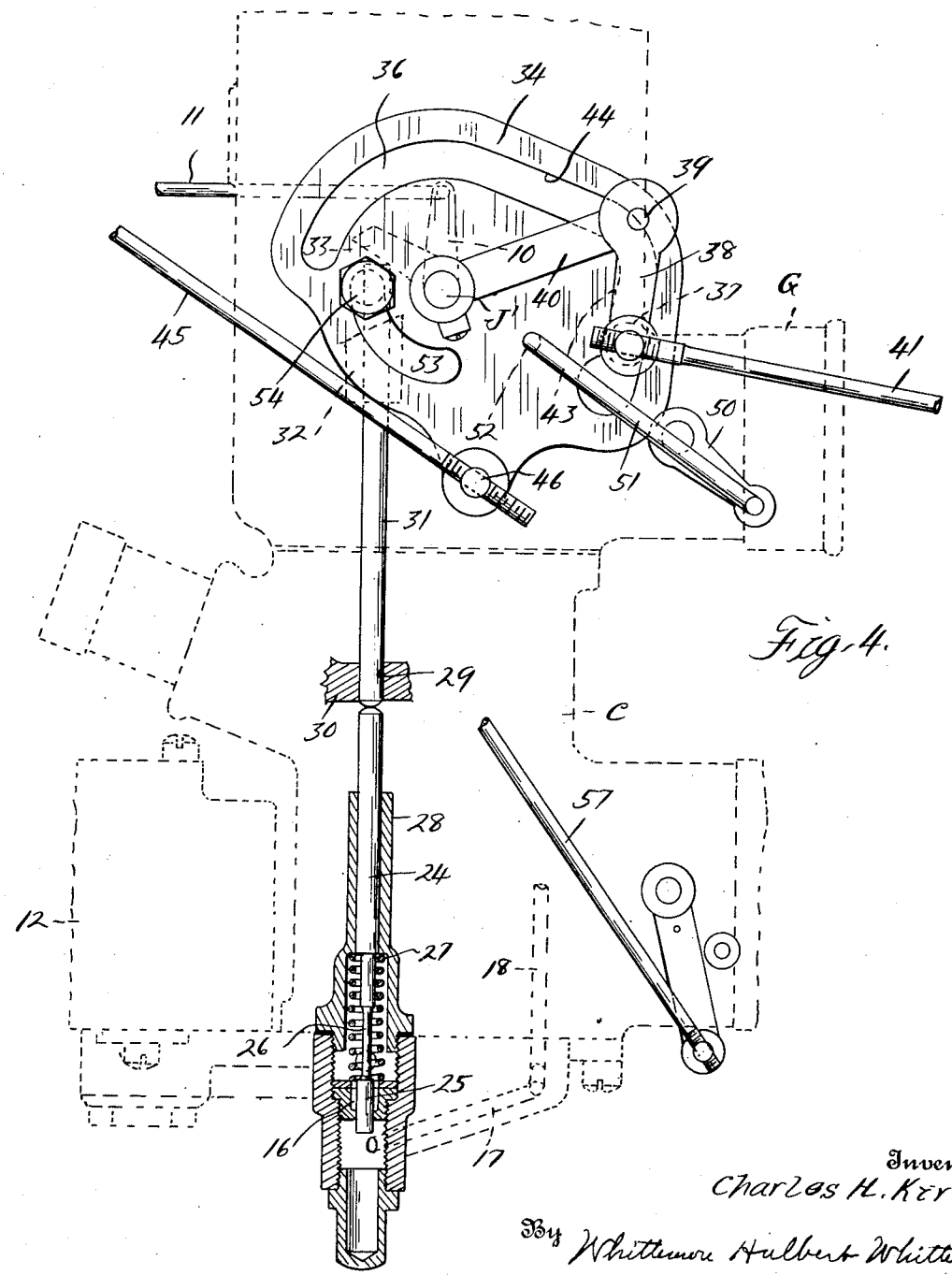

Patented Sept. 10, 1929.

1,727,605

UNITED STATES PATENT OFFICE.

CHARLES H. KIRBY, OF DETROIT, MICHIGAN, ASSIGNOR TO MARVEL CARBURETER COMPANY, OF FLINT, MICHIGAN, A CORPORATION OF ILLINOIS.

COOPERATING HEAT AND FUEL REGULATION FOR INTAKE MANIFOLDS.

Application filed May 14, 1926. Serial No. 109,104.

The invention relates to an improved form of manifold construction for internal combustion engines which provides for the heating of the carbureted mixture and the proper proportioning of the fuel to the air under various conditions of operation. Among the objects of the invention are the following:

First, to provide an intake manifold having a heating jacket connected to the exhaust manifold or other source of heat.

Second, to provide a mixture controlling valve in said heated intake manifold serving to regulate the heating of the mixture by variably deflecting the mixture against the heated walls according to the throttle setting of the engine.

Third, to provide a carburetor unit detachably connected to said manifold and provided with the principal elements for proportioning the fuel supply to the air supply.

Fourth, to provide means cooperating with the mixture controlling valve in the separate heated manifold for regulating the fuel supply in the carburetor unit whereby the regulation of both the heat and the fuel supplied to the mixture are effected simultaneously.

While these and other objects may be attained in a variety of different ways I have hereinafter specifically described one construction which in addition to attaining the above mentioned objects also serves to provide mechanism for regulating the amount of exhaust gases delivered to the jacket of the intake manifold.

In the drawings:

Figure 3 is a sectional plan view on line 3—3 of Figure 2;

Figure 4 is an elevation partly in section of the mechanism for effecting cooperation between the heat control in the heated section and the fuel control in the carburetor unit.

Figure 5 is a view similar to Figure 1, showing parts in a different position of adjustment.

Figure 1:
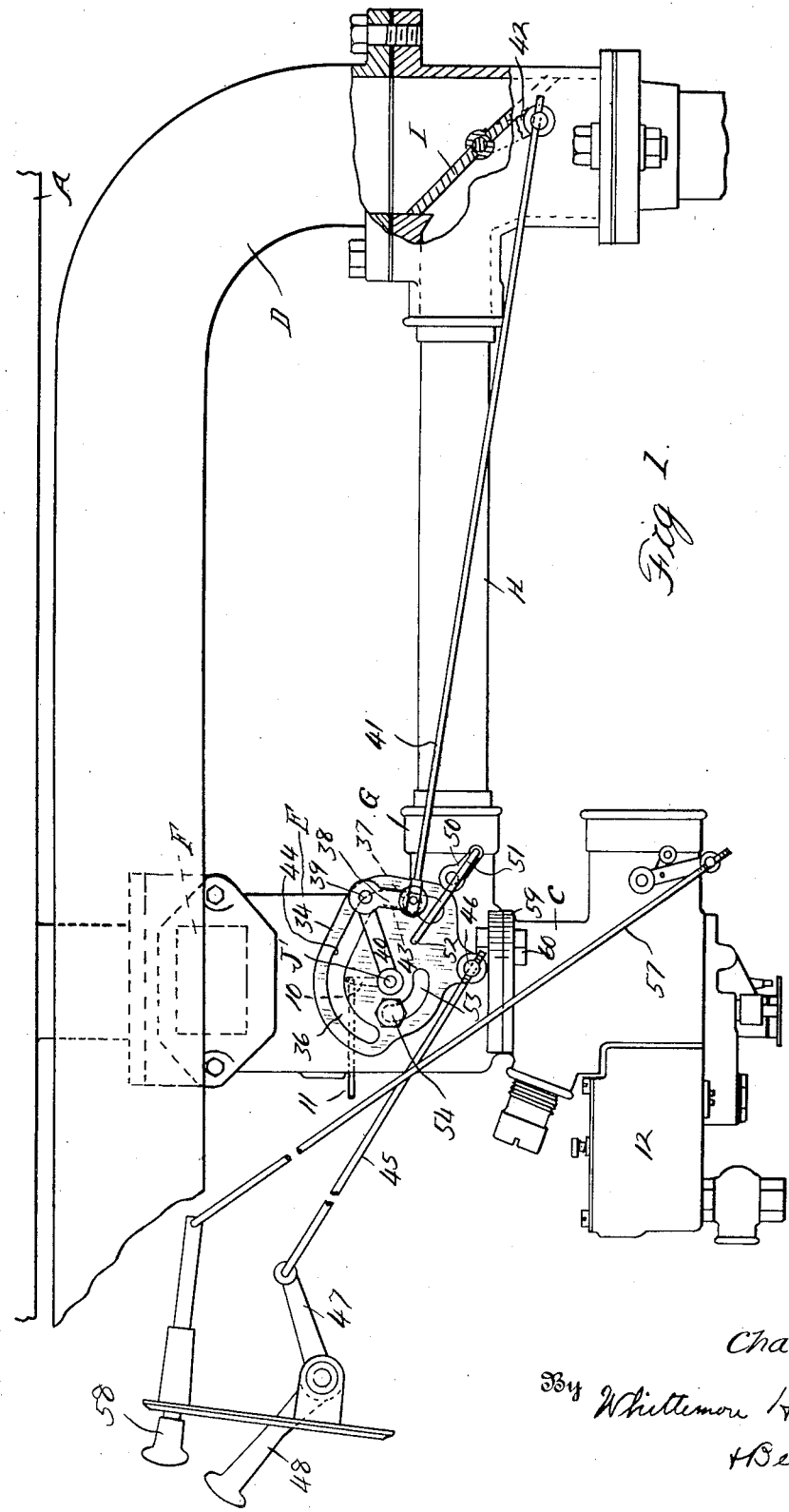
Figure 1 is an elevation of the manifold construction.
Figure 2:
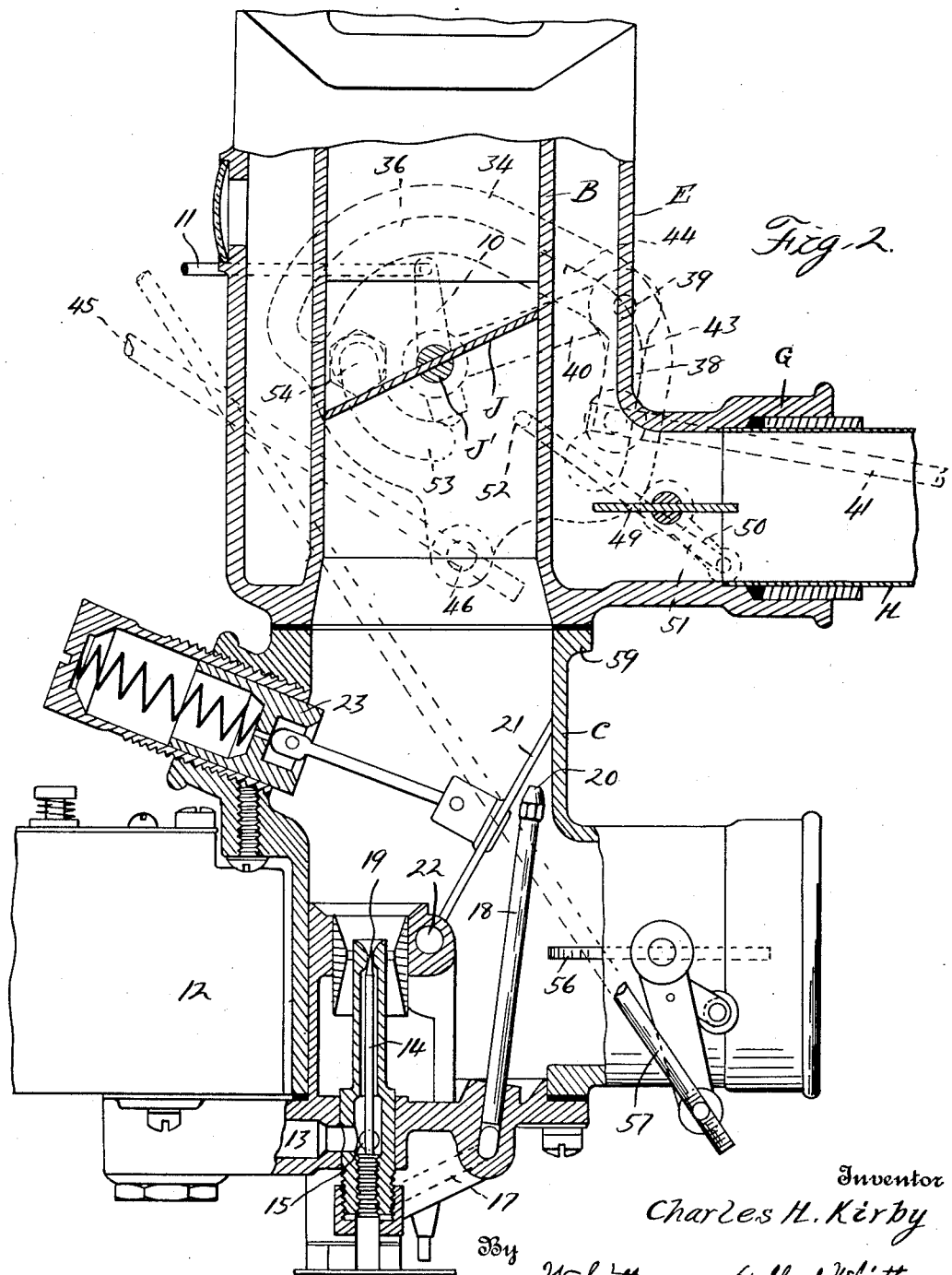
Figure 2 is a vertical section through the carburetor and the riser of the manifold.

Referring now to the specific embodiment of the invention as illustrated in the drawings, A represents the intake manifold of an internal combustion engine, B the vertical riser section of the intake manifold, C the carburetor detachably connected to said riser section and D the exhaust manifold. The riser section B is provided with a surrounding jacket E having an inlet opening F connected to the exhaust manifold D and an outlet opening G connected to another portion of the exhaust conduit to which the conduit H leads is provided with a damper valve I which in its closed position, as shown in Figure 1, compels all of the exhaust gases to pass through the jacket E, while in its open position as shown in dotted lines some of the exhaust gases are by-passed around the jacket E through the portion D' of the exhaust conduit between the opening F and the valve I.

J is a valve arranged in the portion of the riser section B surrounded by the jacket E and as shown is in the form of a butterfly valve mounted on a rod J' extending transversely of the riser section. In the particular embodiment of the invention illustrated, the valve J has two functions. First, it serves as the throttle for the engine controlling the amount of mixture admitted to the engine cylinders and it will be noted that the carburetor unit C is unprovided with any additional throttling member. Second, the valve J serves to deflect the fuel mixture passing through the riser section into contact with the walls which are heated by the exhaust gases in the jacket E. For operating the valve J, the rod J' is provided with a lever 10 to which is pivotally attached a throttle control rod 11 leading in the conventional manner to the accelerator or other control lever for the engine.

The carburetor C may be of any of the conventional types except that as here shown the usual throttle valve in the carburetor itself is dispensed with since the valve J in the riser section functions as the throttle. The carburetor as specifically illustrated has a float bowl 12 from which a fuel passage 13 leads to a nozzle 14 and also leads by reason of the transverse passageway 15 through a metering orifice 16, and a passageway 17 to the main jet nozzle 18. The nozzle 14 is controlled by an adjustable needle valve 19 while the nozzle 18 has a calibrated orifice 20 at the delivery end thereof slightly larger in size than the normal size of the calibrated orifice 16. The nozzle 18 is arranged adjacent an air valve 21 pivoted at 22 and normally held in closed position by a spring pressed plunger 23. The size of the orifice 16 is determined by the cooperation of a metering pin 24 having a portion 25 of a diameter such as to give the calibration desired under slow speed conditions and having a portion 26 of smaller diameter adapted to enlarge the size of the opening 16 when the portion 26 is in registration with the cooperating aperture. The metering pin 24 is normally held in its upper position with the enlarged portion 25 functioning by a coil spring 27. The metering pin 24 projects upwardly through a surrounding housing 28 and the upper end of the pin is in registration with an opening 29 in a lug 30 on the outside of the carburetor casing. 31 is a push rod slidable in the aperture 29 and having its lower end in contact with the upper end of the metering pin. The rod 31 is also supported by a bearing 32 on the riser section B and has its upper end arranged in operative relation to a lug 33 on the lever 10. The arrangement is such that when the throttle J is in closed position the metering pin 24 is in its upper position with the enlarged portion 25 determining the size of the metering orifice 16. This orifice being slightly smaller than the orifice 20 at the discharge end of the main nozzle 18 serves to regulate the amount of fuel delivered by the main jet at comparatively low speeds. As the throttle J is opened wider the lug 33 acts through the medium of push rod 31 and forces the metering pin 24 downwardly but for slight throttle openings the cylindrical portion 25 of the metering pin is still in operative relation to the metering orifice and the amount of fuel supplied to the main nozzle is not affected by the movement of the metering pin. When, however, the throttle J is opened wider to a certain predetermined position, the reduced portion 26 of the metering pin comes into operation and enlarges the metering orifice 16 so that a larger supply of fuel can pass therethrough. The diameter of the portion 26 is such as to provide a larger opening at the metering orifice 16 than at the discharge orifice 20 of the main nozzle so that under these conditions the amount of fuel delivered by the main nozzle 18 is limited only by the calibration of the discharge orifice 20.

As stated above, the amount of exhaust gases passing through the jacket E is determined by the setting of the damper valve I and in order to regulate the supply of heat to the riser section B under various conditions of operation the following controlling mechanism is employed. 34 is a cam plate mounted on a bushing 35 at one end of the throttle rod J', this cam plate being arranged for rotative adjustment about the axis of said rod. The cam plate is provided with a cam groove 36 for receiving a roller 37 carried at one end of a link 38, the other end of which is pivoted at 39 to a lever 40 on the rod J'. 41 is a rod pivotally connected to the link 38 in axial alignment with the roller 37 and extending from this point to a lever 42 on the damper valve I. The cam groove 36 is so fashioned that with the parts in the positions shown in Figure 1 the roller 37 engages one end of the cam groove and both the throttle J and damper valve I are in closed position. Upon the opening of the throttle J, the lever 40 and link 38 impart a movement to the roller 37 in the cam groove and the first portion 43 of this groove is so fashioned that the movement of the roller does not affect the setting of the damper valve I. Upon further opening of the throttle, however, the roller engages a second portion 44 of the cam groove which is fashioned to cause the roller to actuate the rod 41 and open the damper valve I. While the shape of the cam groove 36 may be varied as desired it is preferably so arranged that for a limited throttle opening the damper valve I remains closed. After this point in the opening of the throttle the damper valve is variably opened according to the setting of the throttle. In this manner the heat to the riser section of the intake manifold is regulated according to the throttle opening since the opening of the damper valve I permits a portion of the exhaust gases to be by passed through the exhaust manifold D'.

In order to vary the amount of heat delivered to the riser section under different outside temperature conditions mechanism is provided for rotatively adjusting the cam plate 34 and as shown this comprises an operating rod 45 pivotally connected to the cam plate at 46 and extending to a remote point preferably the dash of the car where it is connected to a bell crank lever 47. This lever is provided with an operating handle 48 which in the position shown in Figure 1 is arranged for winter driving when the maximum heat to the riser section is desired. By operating the handle 48 the cam plate 34 is adjusted about the axis of the rod J' so that the roller 37 approaches the portion 44 of the cam groove. Consequently when the throttle is opened the damper valve I is also opened earlier than when the cam plate is in the position first described. There is also a second means for reducing the amount of heat delivered to the riser section in the adjusted position of the cam plate, this means comprising the valve 49 pivotally mounted in the outlet G of the heating jacket and operatively connected to the cam lever 50 and link 51. The link 51 is pivotally secured to the cam plate at 52 and is so arranged that when the operating handle 48 is in its upper position of adjustment the valve 49 is at its maximum opening while adjusting the cam plate 34 results in a corresponding closing movement of the valve 49. The cam plate 34 is preferably provided with a segmental slot 53 through which extends a pin 54 secured to the riser section at its inner end and carrying at its outer end a coil spring 55. The spring bears against an apertured plate which in turn bears against the cam plate 34 and provides sufficient resistance to the adjustment of the cam plate so that it will remain in any position in which it is set by the adjusting handle 48.

The carburetor C is provided with the usual choke valve 56 connected by linkage 57 to an operating handle 58 accessible to the operator of the engine. The carburetor C is provided with a flange 59 detachably connected to the riser section B by suitable retaining means such as bolts 60.

Having now described a particular embodiment of my invention I wish to call attention to a number of features which have been incorporated in the same and render the device of particular value. First it will be noted that the carburetor unit containing the principal elements for proportioning the fuel to the air supply is detachably connected to the riser section of the manifold without requiring the removal of any of the connection to the exhaust manifold. This is due to the fact that the exhaust heat is not conducted to the carburetor unit but is confined to the riser section above the carburetor unit. There are a number of advantages in this type of construction among which are the following:

(a) The heat is not brought into proximity to the metering orifices of the carburetor and therefore their calibration is unaffected.

(b) The carburetor contains the elements which most frequently require service attention and, as the carburetor unit is removable without affecting the manifold connections, this construction is especially adaptable for efficient service when adjustment of the carburetor parts is required.

(c) The division of the carburetor from the heated section of the manifold facilitates handling and machining in production and thereby entails a cost reduction that is important.

Another feature of the construction is the removal of the throttle member from the carburetor unit and locating the same in the heated section of the manifold. This permits of the location of the mechanism for controlling the exhaust heat to the manifold entirely separate and distinct from the carburetor unit. Furthermore, it enables the throttle to serve two functions namely to control the amount of mixture delivered to the engine and to variably deflect the mixture against the heated walls according to the demands of the engine.

Another feature of the device is the arrangement whereby the throttle valve located in the separate heated section may cooperate with the fuel supply in the separate carburetor unit so as to aid in the proportioning of the mixture under various operating conditions.

A further and more specific advantage of the construction is that I have provided a single mixture controlling valve separate from the carburetor unit and serving to control the supply to the engine, control the amount of heat delivered to the manifold, control the contact of the mixture with the heated walls and also control the fuel regulation of the principal fuel feed supply of the carburetor.

What I claim as my invention is:

1. In an internal combustion engine, the combination with an intake manifold, and means for heating the walls thereof, of a separate carburetor detachably connected to said heated manifold, a fuel nozzle in said carburetor, a fuel valve controlling the supply to said nozzle, an actuating member for said fuel valve projecting from said carburetor, a throttle valve in said heated intake manifold, a lever connected to said throttle, and a slidable push rod engaging said lever and said actuating member.

2. In an internal combustion engine, the combination with an intake manifold, and means for heating the walls thereof, of a separate carburetor detachably connected to said heated manifold, a fuel supply nozzle in said carburetor, a fuel supply passage to said nozzle having a calibrated orifice therein, a metering pin extending through said orifice and having two portions of different diameters alternatively co-operating with said orifice, means for normally maintaining said metering pin in one of said alternative positions, a throttle valve in said heated manifold adapted to variably deflect the mixture against said heated walls and a mechanical connection between the throttle in said manifold and said metering pin in said carburetor for moving said metering pin to the other alternative position upon a predetermined opening of said throttle valve.

3. In an internal combustion engine, the combination with an intake manifold, and means for heating the walls thereof, of a separate carbureter detachably connected to said heated manifold, variable fuel supply means in said carbureter, a member for varying said fuel supply, a throttle valve in said manifold, and connections from said throttle for actuating said fuel controlling member, said connections being engageable and disengageable upon connection of said carbureter with, and its disconnection from, the intake manifold.

In testimony whereof I affix my signature.

CHARLES H. KIRBY.